United States Patent [19]

Degelman et al.

[11] Patent Number: 4,726,303
[45] Date of Patent: Feb. 23, 1988

[54] ZERO-TILL DRILL

[75] Inventors: Wilfred Degelman, Regina; Valentine T. Cadamia, Southey, both of Canada

[73] Assignee: Degelman Industries Ltd., Regina Saskatchewan, Canada

[21] Appl. No.: 48,983

[22] Filed: May 12, 1987

Related U.S. Application Data

[63] Continuation of Ser. No. 830,490, Dec. 2, 1985, abandoned.

[51] Int. Cl.⁴ .............................................. A01C 5/00
[52] U.S. Cl. ........................................ 111/52; 111/85; 172/398; 172/417; 172/421; 172/427
[58] Field of Search .................... 111/1, 8–34, 111/52, 52 WT, 59, 68, 73, 80, 85, 86, 51, 54, 55, 74, 75, 76, 81; 280/43.2, 43.24; 172/400, 401, 405, 413, 417, 421, 462, 464, 484, 624, 624.5, 240, 398, 427; 222/624, 625; 239/455

[56] References Cited

U.S. PATENT DOCUMENTS

| | | | |
|---|---|---|---|
| 934,828 | 9/1909 | Nation | 111/14 |
| 1,371,012 | 3/1921 | Williams | 111/52 WT |
| 2,091,823 | 8/1937 | Large | 111/59 |
| 2,159,652 | 5/1939 | Brunner | 111/52 |
| 2,641,210 | 6/1953 | Brock | 111/80 |
| 3,060,873 | 10/1962 | Powers | 111/51 |
| 3,091,476 | 5/1963 | Blake | 172/413 |
| 3,115,853 | 12/1963 | Gellner | 111/68 |
| 3,117,541 | 1/1964 | Todd et al. | 111/62 |
| 3,705,560 | 12/1972 | Lappin | 111/52 |
| 3,913,683 | 10/1975 | Olsson et al. | 111/54 |
| 4,083,411 | 4/1978 | Van Der Lely | 172/417 |
| 4,417,530 | 11/1983 | Kopecky | 111/73 |
| 4,506,609 | 3/1985 | Tuss et al. | 111/52 |
| 4,519,460 | 5/1985 | Gust | 111/85 |
| 4,580,507 | 4/1986 | Dreyer et al. | 111/73 |

FOREIGN PATENT DOCUMENTS

350948 6/1931 United Kingdom ............ 111/52

*Primary Examiner*—James R. Feyrer
*Attorney, Agent, or Firm*—Chernoff, Vilhauer, McClung & Stenzel

[57] ABSTRACT

This invention is directed to a novel zero-till seed drill which has a shortened wheel base and can thus closely follow the contours of a field which is being seeded, is capable of being raised and lowered at the beginning and end of each pass on the field, and has adjustable level and packer wheel weight capability. The invention is directed to a zero-till drill apparatus which is adapted for optionally carrying a Coulter disk, at least one seed drill, and a holder for carrying seeds, the apparatus being mounted on transport wheels. The apparatus includes means for raising at least one of the transport wheels off the ground while the Coulter disk and/or drill are on the ground in position for dispensing seeds into the ground, and lowering the transport wheel onto the ground when the Coulter disk and/or drill are raised off the ground.

3 Claims, 12 Drawing Figures

ZERO-TILL DRILL

This application is a continuation of application Ser. No. 803,490, filed 12/2/85, now abandoned.

FIELD OF THE INVENTION

This invention is directed to a novel zero-till seed drill which has a shortened wheel base and can thus closely follow the contours of a field which is being seeded, is capable of being raised and lowered at the beginning and end of each pass on the field, and has adjustable level and packer wheel weight capability.

BACKGROUND OF THE INVENTION

Modern farming techniques and philosophy discourage the ploughing of fields into "black land". A field which has been completely plowed, or even strip plowed, is, among other things, susceptible to wind and water erosion, with attendant loss of valuable topsoil. Current modern farming practice calls for grain growers to seed and fertilize a field without plowing the field. This is done by using a zero-till drill which, by means of Coulter disks, seed and fertilizer drills, and packer wheels, sows the seed and the fertilizer directly under the stubble and soil without breaking the stubble and soil to any significant extent.

In situations where the topsoil has been tilled, Coulter disks are not necessary because the seed and fertilizer can be sown by the drills directly into the tilled soil.

In both zero-till drill and seed sowing into tilled soil procedures, the fertilizer is usually injected into the soil at a level 2 to 3 inches below the level at which the seed is deposited in the soil. This encourages the roots of the germinating seed to extend downwardly, rather than laterally or upwardly. Thus, the germinated seed sets down solid roots which in turn encourages strong growth of the cereal plant above the topsoil.

A typical zero-till seeder and fertilizer drill is manufactured by Haybuster Incorporated, North Dakota, U.S.A. The Haybuster drill comprises a rigid frame which is mounted on pairs of tires fore and aft. The Haybuster drill is pulled by a tractor or other suitable vehicle. The rigid frame carries seed and fertilizer hoppers above the frame and underneath, a sub-frame which can be raised or lowered by rotation about laterally extending rocker arms. The sub-frame carries below it a combination of Coulter disks (optional), seed drills and packer wheels, extending in lateral rows across the sub-frame.

A principal shortcoming of the Haybuster drill is that it has a long wheel base which is primarily caused by the construction of the sub-frame and the need to have "swing room" as the sub-frame carrying laterally extending parallel rows of Coulter disks, if present, seed and fertilizer drills and packer wheels is raised and lowered. This is a major disadvantage when the Haybuster drill is drawn over uneven terrain. For example, when the Haybuster drill is drawn over small hills, the seed drills are forced deeper in the soil than should be the case. This means that the seed and fertilizer are deposited in the soil at deeper than optimum depths, which thereby hinders good crop production. The reverse is the case when a dip or hollow in the terrain occurs. The seed and fertilizer are then deposited by the drills at shallow depths in the soil, which is detrimental to good crop yield. To obtain uniform fertilizer and seed deposit depths in the soil, and thereby maximize crop yield, a short wheel base is very desirable because then the zero-till drill can more closely track the contours of the uneven terrain and consistently deposit seed and fertilizer in the soil at optimum depth.

The Haybuster drill has another disadvantage in that when it carries Coulter disks, they are carried in a lateral aligned row. This can create a problem in the field because the uniform in-line "front" presented by the lateral row of Coulter disks tends to collect and build up straw and stubble which must then be periodically cleared away from the Coulter disks. The collected straw and stubble can also interfere with the efficient operation of the Coulter disks.

Another shortcoming of the Haybuster drill is that it is not possible to lift the packer wheels off the soil when the end of a pass on the field is reached. Packed soil is detrimental to crop production on a cropped field and hence it would be advantageous if overpacking could be avoided as much as possible.

A further disadvantage of the Haybuster drill is that the seed and fertilizer drills are set a good distance behind the Coulter wheels. Thus Coulter disks cut the stubble several feet ahead of the following seed drills. This does not present a problem so long as the Haybuster drill is drawn in a staight line and the seed drills are able to follow in the grooves cut by the Coulter disks. However, when the Haybuster drill is towed by a tractor along a curved or uneven path, the seed drills do not necessarily follow in the grooves cut by the Coulter disks. Moreover, on a curved path, the packer wheels which follow behind the seed drills do not necessarily pack the rows in which the seed and fertilizer have been deposited by the seed drills. This non-alignment deficiency tends to defeat the purpose and advantage of the Coulter disk, seed drill and packer wheel combination.

Regarding other prior art, the applicant is aware of U.S. Pat. No. 4,417,530, Ivayl D. Kopecky, granted Nov. 29, 1983 to Haybuster Manufacturing Inc., Jamestown, North Dakota. This U.S. patent discloses and claims a device for planting seed and applying fertilizer including a frame adapted to be moved over the ground and a furrow opener shank carried on the frame.

SUMMARY OF THE INVENTION

The invention is directed to a seed and fertilizer drill apparatus which is adapted for carrying at least one seed drill, and a holder for carrying seeds, the apparatus being mounted on transport wheels. The apparatus can also optionally carry at least one Coulter disk for cutting the soil. The apparatus includes means for raising at least one of the transport wheels off the ground while the Coulter disk and drill are on the the ground in position for dispensing seeds into the ground, and lowering the transport wheel onto the ground when the Coulter disk and drill are raised off the ground.

In the apparatus at least one packer wheel may be located in longitudinal alignment immediately behind the Coulter disk and drill, the packer wheel riding on the ground when the Coulter disk and drill are on the the ground, and being raised off the ground when the Coulter disk and drill are raised off the ground. The apparatus may have two transport wheels which are raised off the ground when the Coulter disk, drill and packer wheel are on the ground and ride on the ground when the Coulter disk, drill and packer wheel are raised off the ground. The means for raising and lowering the transport wheels may be a hydraulic cylinder.

In the apparatus, the means for raising and lowering the transport wheels and the means for raising and lowering the packer wheel may cooperate with one another so that when the transport wheels are in a lowered position and the packer wheel is in a raised position, there is no movement between the means for raising and lowering the transport wheel and the means for raising and lowering the packer wheel, while when the packer wheel is in a lowered position, and the transport wheel is in a raised position, there is room for movement between the means for raising and lowering the transport wheel and the means for raising and lowering the packer wheel. The apparatus may have a main frame, a plurality of Coulter disks, drills and packer wheels are suspended from the main frame, and independent means may be provided for enabling the packer wheels and the transport wheels to pivot about separate lateral axes relative to the main frame.

In the apparatus, the Coulter disks and the seed drills may be arranged in pairs, and the pairs may be discretely distributed across the underside of the main frame of the apparatus in two lateral rows, one behind the other, the positioning of the Coulter disk and drill pairs in the forward row being laterally offset in relation to the Coulter disk and drill pairs in the rear row. Optionally, the apparatus can be structured to carry more than two rows of Coulter disk and drill pairs, if that is desirable. In the apparatus, a plurality of packer wheels may be arranged in a row extending laterally in relation to the main frame of the apparatus behind the pairs of Coulter disks and drills, the packer wheels being aligned longitudinally with respective Coulter disk and drill pairs in the forward and rear rows.

In the apparatus, means may be provided for adjusting the force which the packer wheels apply upon the ground when the Coulter disks, drills and packer wheels are in a lowered position upon the ground. Means may be provided for restraining the Coulter disks, drills and packer wheels being raised or lowered beyond a certain predetermined point. Means may also be provided for restraining the transport wheels from being raised or lowered beyond a certain predetermined point.

In the apparatus, the transport wheels may be rotated about a vertically extending axis through an arc of about 90 degrees. The transport wheels which can be raised and lowered may be located at the rear of the apparatus. The transport wheels located at the front of the apparatus may be swivelled through a horizontally extending plane about a vertical axis. The means through which the forward transport wheels can be swivelled through a vertical axis may comprise a caster-type mechanism. The caster swivel mechanism may be connected to the main frame of the apparatus by means of a pair of substantially parallel linking bars, one disposed above the other, the substantially parallel bars cooperating with one another and being maintained in a substantially parallel orientation with respect to each other, as the rear transport wheels of the apparatus are raised from or lowered onto the ground, and the substantially parallel bars maintain the caster-type mechanism in a substantially vertical position. The forward and rear transport wheels may be pneumatically inflated rubber tire wheels.

In the apparatus, the elevation of the rear transport wheels may be adjusted manually relative to means which connects the rear transport wheels to the main frame. The hydraulic raising and lowering means may also be manually controlled. The hydraulic raising and lowering means may be manually controlled by the operator of a vehicle towing the zero-till drill apparatus.

In the apparatus, the apparatus may carry a hopper for seed and another hopper for fertilizer, the seed and fertilizer being dispensed at a predetermined rate from each hopper to the seed-fertilizer drill which is mounted on the underside of the apparatus. The seed-fertilizer drill may be mounted under the apparatus by means of a trip release mechanism which enables the seed-fertilizer drill to move upwardly or laterally when an obstruction is struck by the seed-fertilizer drill and returns the seed-fertilizer drill to seeding position after the obstruction has been skirted. The mechanism for dispensing seed and fertilizer from the hoppers may be driven by a clutch means which is connected to a seed dispenser drive wheel.

The invention is also directed to a materials dispensing device which regulates the rate at which material is dispensed from the device by means of a diamond-shaped opening which can be positionially adjusted relative to a circular-shaped opening, the dispensation rate of the material from the dispenser passing through and being controlled by the opening created by the area of overlap between the circular opening and the diamond-shaped opening.

The dispenser may have at least two dispensing openings therein, the aperture in each opening being regulated by a linking means so that each aperture is of the same size at any given time. The dispenser apparatus may be mounted on an outlet part of a solid or liquid handling container. The dispensing apparatus may be mounted at the base of a solid material handling hopper which is mounted on a portable particulate material dispensing apparatus. The dispensing apparatus may also be mounted at the base of a seed or fertilizer hopper carried by a zero-till seed drill. The openings created by the dispensing device in the hopper of the zero-till drill may be connected by a tubular means to a seed drill of the zero-till drill.

The dispensing apparatus may include a gauge displaying the degree of opening in the dispensing apparatus connected to the zero-till drill.

The invention is also directed to a portable apparatus for distributing seed and fertilizer into the ground on a continuous basis comprising: (a) means for depositing the fertilizer in the ground at a predetermined depth as the apparatus is drawn horizontally across the ground; (b) means for depositing the seed in the ground at a depth above the level of deposition of the fertilizer as the apparatus is drawn horizontally across the ground; and (c) means for delaying the deposition of the seed so that soil disrupted by the fertilizer depositing means as it is drawn across the ground has an opportunity to cover the fertilizer before the seed is deposited in the ground at a higher elevation than the fertilizer.

The seed delay means may be a plate which rides on the surface of the ground and pushes dirt over the deposited fertilizer as the seed-fertilizer depositing apparatus is drawn across the ground, the seed being deposited on the top-side of the plate before it is deposited in the ground. The seed-fertilizer depositing apparatus may be mounted on the underside of a zero-till drill, and immediately behind a Coulter disk which cuts a groove in the ground, the seed-fertilizer depositing apparatus travelling in the groove created by the Coulter disk, as the apparatus is drawn across the ground. A packer wheel may be mounted behind the seed-fertilizer depositing apparatus and presses loose soil into the groove cut by the Coulter wheel and the seed-fertilizer depositing apparatus as the apparatus is drawn across the ground. A detachable hardened nose may be secured to the front side of the seed-fertilizer depositing apparatus.

DETAILED DESCRIPTION OF ONE EMBODIMENT OF THE INVENTION

Figure 1:
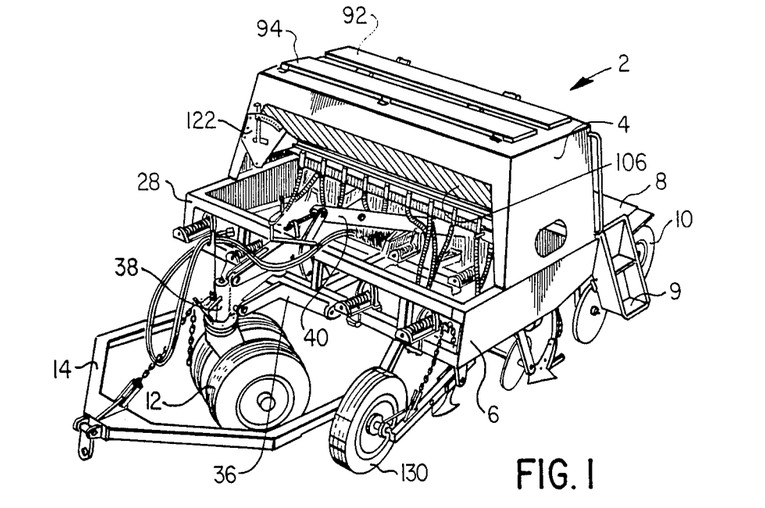
FIG. 1 illustrates a frontal perspective view of the zero-till drill.

Referring to the drawings, FIG. 1 illustrates a frontal perspective view of the zero-till drill 2. Basically, the zero-till drill 2 is constructed to carry a fertilizer-seed hopper housing 4 on a main frame 6 which, when the zero-till drill 2 is in a transport mode and not in seeding and fertilizing mode, is carried on a pair of rubber tire caster wheels 12 at the front and a pair of rubber tire transport wheels 10 at the rear. A platform 8 is built upon the main frame 6 and has constructed on each side thereof steps 9. The steps 9 and the platform 8 enable the farmer (operator) to mount the zero-till drill 2 and fill the hopper housing 4, or make adjustments to the fertilizer and seed settings of the zero-till drill 2. The drill 2 is pulled by a draw bar 14.

Also visible in FIG. 1 are forward upper cross-bar 28, lower parallel yoke 36, main tie bar 40, caster swivel 38, fertilizer door 92, seed door 94, hopper 106, seed opening gauge 122, and a seed dispenser drive wheel 130, all of which will be explained in further detail below in association with other drawings.

Figure 2:
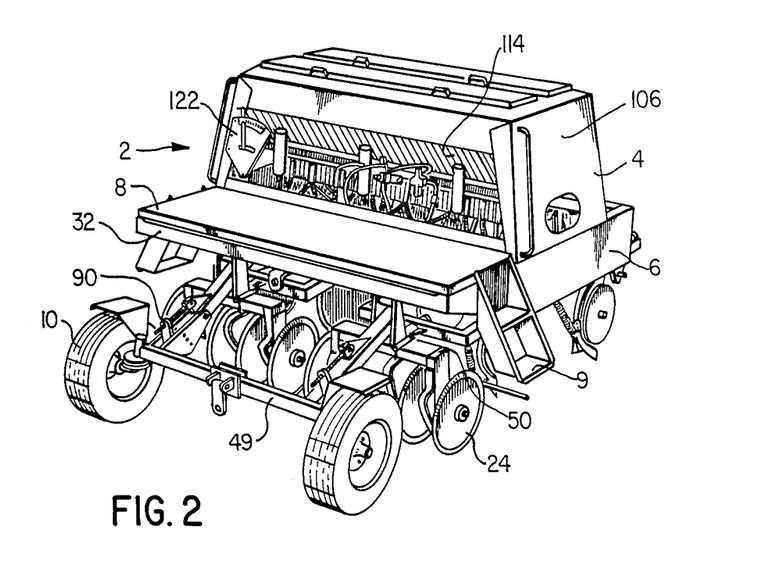
FIG. 2 illustrates a rearward perspective view of the zero-till drill.

FIG. 2, which illustrates a rear perspective view of the zero-till drill 2, provides a full view of the rear of the fertilizer-seed hopper housing 4, main frame 6, platform 8, steps 9 (built on the opposite side of the platform 8 from that shown in FIG. 1) and the pair of rubber tire transport wheels 10. Also visible in FIG. 2 are rear upper cross-bar 32, transport wheel cross-bar 49, transport wheel adjustment 90, packer lateral pivot arm 50, packer wheels 24, rear trough (fertilizer) 114 and seed opening gauge 122, all of which will also be discussed in further detail below.

Figure 3:
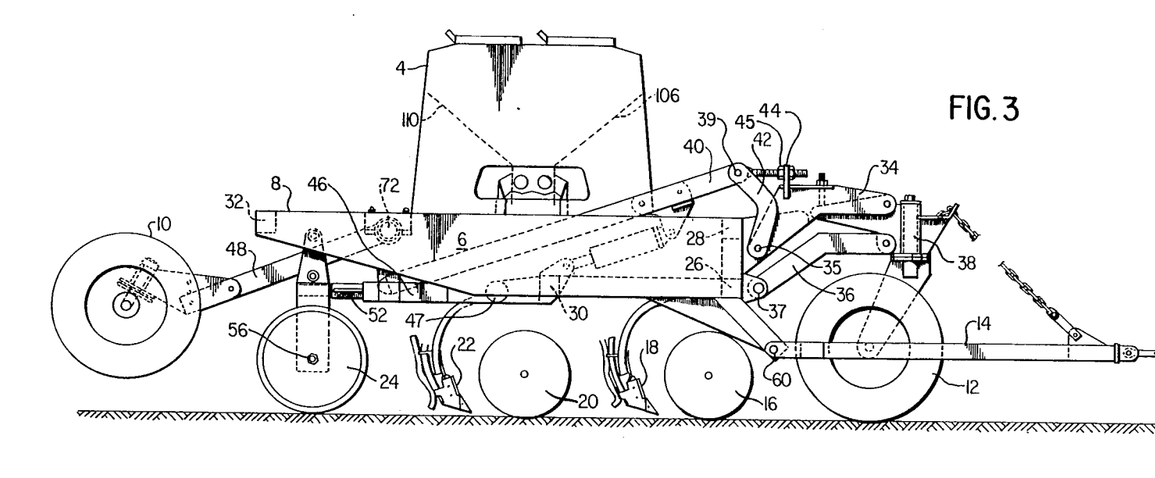
FIG. 3 illustrates a side elevation view of the zero-till drill.

FIG. 3, which illustrates a side elevation view of the zero-till drill 2, depicts a number of the components of the drill 2 and the manner in which those components are connected to the main frame 6 and arranged relative to one another. The front of the zero-till drill 2 (the right side of FIG. 3), is supported by a pair of rubber tire caster wheels 12. These are located between the draw bar 14 and swivel about a vertical axis by means of caster swivel 38. Carried under the main frame 6 are a laterally extending row of forward Coulter disks 16, which followed immediately by a laterally extending row of forward seed and fertilizer drills 18. These in turn are followed by a laterally extending row of rear Coulter disks 20, which in turn are followed by a laterally extending row of rear seed and fertilizer drills 22. These two pairs of complementary disks and drills are followed by a laterally extending row of packer wheels 24.

As an option, the drill 2 can be utilized without the Coulter disks 20 in cases where the field has already been tilled and only sowing of seed and fertilizer through the seed and fertilizer drills 22 is required.

Extending laterally across the main frame 6 and rigidly connecting the entire assembly together are a forward lower cross-bar 26, a forward upper cross-bar 28, a rear lower cross-bar 30 and a rear upper cross-bar 32. Except for these laterally extending cross-bars 26, 28, 30 and 32, the interior underside of the overall main frame 6 is open. These components of main frame 6 are welded together to provide a rigid construction. The open area within frame 6 permits freedom of movement for the disks 16 and 20 (when present), drills 18 and 22 and packer wheels 24, and enables connecting seed and fertilizer conveying tubes to run easily from the seed and fertilizer hoppers 106 and 110 to the drills 18 and 22.

FIG. 3 also illustrates at the front end of main frame 6, upper parallel bar 34 and lower parallel yoke 36. Upper parallel bar 34 is pivotally connected to raise stop 88 by means of lateral pivot axle 35. Raise stop 88 is rigidly connected to main frame 6. Lower parallel yoke 36 rotates laterally about horizontal laterally extending lower parallel yoke pivot axle 37 which is connected to lower cross-bar 26. The caster swivel 38, which provides the pivot axis for the pair of rubber tire caster wheels 12, is pivotally connected to the forward ends of upper parallel bar 34 and lower parallel yoke 36. The rear portion of upper parallel bar 34, besides being connected to pilot 35, is pivotally connected in series to main tie bar 40 by means of a forward link bar 42 and upper lateral pivot 39. The position of forward link bar 42 relative to upper parallel bar 34 is controlled by mechanical packer pressure adjustment 44. The operation of these respective pieces will be discussed in more detail below.

At the rear end of the zero-till drill 2 (the left side of the drawing), the pair of transport wheels 10 are connected in rotational orientation to transport wheel swingarm 48. In fact, there are two parallel rearwardly extending transport wheel swingarms 48, which are laterally connected to one another by means of transport wheel cross-bar 49 (see FIG. 2). The pair of rearwardly extending transport wheel swingarms 48, and transport wheel cross-bar 49, pivot upwardly and downwardly about laterally extending rocker shaft 72, which is fastened to upper underside of the main frame 6. The laterally extending series of packer wheels 24 is pivotally connected to the main frame 6 by means of rearwardly extending packer swingarms 46 which pivot upwardly or downwardly about pivot 47 which is fastened to the main frame 6. These components will be discussed in more detail below.

Figure 4:
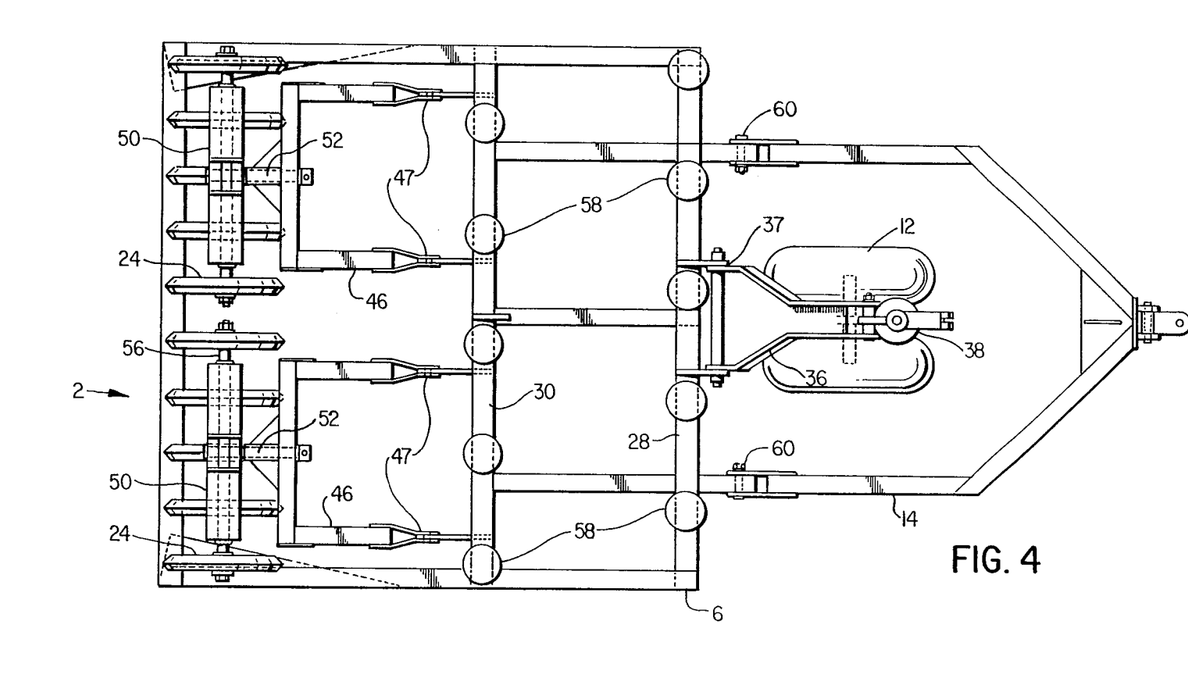
FIG. 4 illustrates a plan view of the frame of the zero-till drill.

Referring to FIG. 4, which shows a plan view of some of the main components of the main frame 6, the draw bar 14 is pivotally connected to the main frame by means of a pair of draw bar pivots 60. In this way, the draw bar 14 can be raised or lowered as required to connect with the towing vehicle (not shown). The pair of rubber tire caster wheels 12 are positioned in the interior area traced by the yoke shaped draw bar 14 and can pivot in a caster-like manner about a vertical axis through caster swivel 38. Lower parallel yoke 36 is pivotally connected to lower parallel yoke pivot axle 37, which in turn is connected to the laterally extending forward lower cross-bar 26. While it is not visible in FIG. 4, forward lower cross-bar 26 exists immediately under forward upper cross-bar 28. Rear lower cross-bar 30 can be seen in FIG. 4 laterally extending across the main frame 6.

The suspension systems for the forward Coulter disks 16, forward seed and fertilizer drills 18, rear Coulter disks 20 and rear seed and fertilizer drills 22 are connected respectively to forward lower cross-bar 26 and rear lower cross-bar 30. As can be seen in FIG. 4, the vertical pivot shafts 58 for the forward and rear Coulter disks 16 and 20 (and also seed drills 18 and 22 respectively) are not positioned in alignment with one another along a longitudinal axis of main frame 6. In other words, the pivot shafts 58 for the various Coulter disks 16 and 20 and the like are staggered in the forward and rear rows relative to one another. This is advantageous because it reduces the likelihood that the forward Coulter disks 16 will collect and pile up straw and stubble when operating in the field thereby requiring the farmer to stop from time to time. By utilizing this staggered orientation for the forward and rear Coulter disk series 16 and 20, and thereby maximizing the space beteen the respective Coulter disks, strong stubble pile-up is minimized. Greater space between the disks 16 and 20 in the forward and rear rows also minimizes the likelihood of boulders, and the like, becoming caught between the disks 16 and 20. Furthermore, since the series of forward seed and fertilizer drills 18 are immediately positioned behind the respective forward Coulter disks 16, and the rear seed and fertilizer drills 22 are positioned immediately behind their respective rear Colter disks 20, the problem of failing to obtain alignment between the disks 16 and 20 and the drills 18 and 22 respectively when the zero-till drill 2 is pulled or towed along a curved or non-linear path is minimized.

Figure 5:
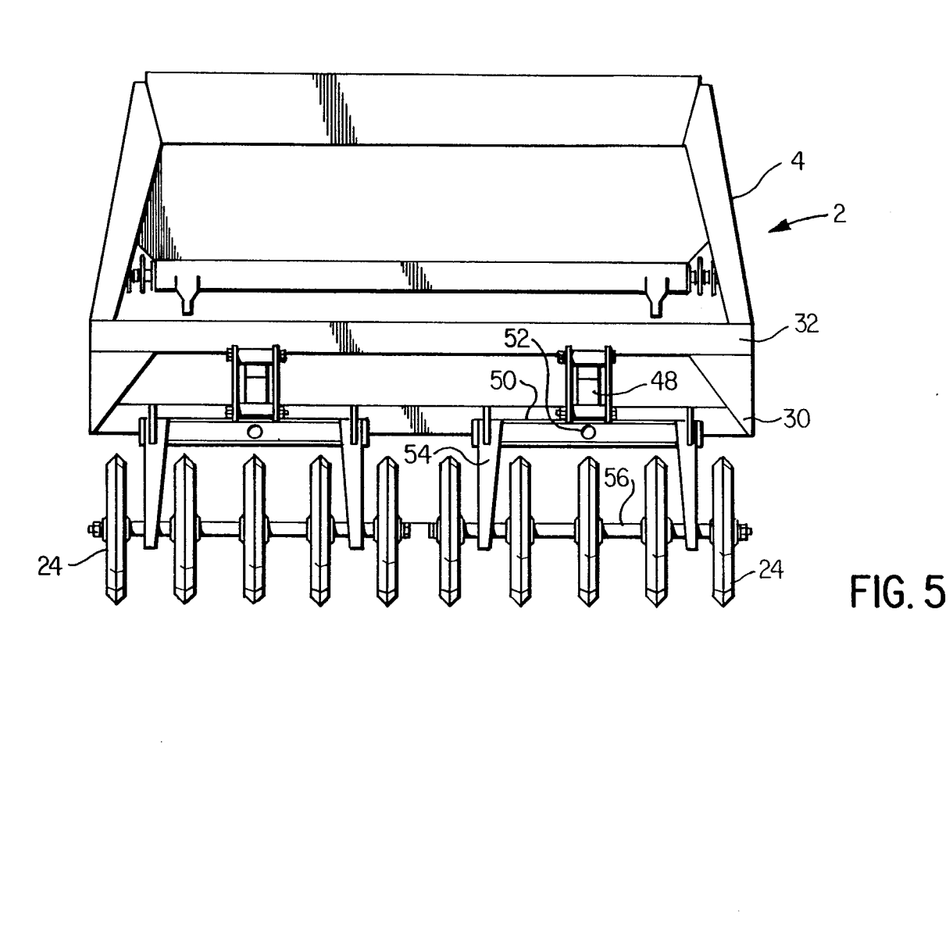
FIG. 5 illustrates a rear elevation view of the right side of the zero-till drill.

FIG. 5, which illustrates a rear elevation view of the zero-till drill 2, discloses the manner in which the five packers 24, arranged in a row which extends laterally underneath the main frame 6, are held in longitudinal axis rotational position relative to one another by means of a laterally extending packer pivot arm 50. Pivot arm 50 pivots about pivot joint 52 which in turn is mounted upon a pair of packer support legs 54 which are rotationally connected to the packer gang axle 56. An end view of the right transport wheel swingarm 48 can be seen immediately above the middle packer 24.

As FIG. 4, taken alone or in combination with FIG. 5 illustrates, two gangs of packers 24 are arranged in laterally extending groups of two, each gang being secured pivotally to the main frame 6 (indirectly) by a pair of parallel rearwardly extending packer swing arms 46. As explained in part previously, the two gangs of five packer wheels 24 are rotationally mounted respectively on a pair of laterally extending axles 56, each of which can tilt laterally in either direction by means of respective packer lateral pivot arms 50, which pivot respectively about pivot point 52 in each case. This orientation is advantageous because it enables each gang of five packer wheels 24 to tilt individually in order to accomodate uneven terrain and to minimize the tendency of the packers 24 to dig in at any one point. Having each of the dual gangs of packer wheels 24 pivot independently provides greater flexibility and allows each gang of packer wheels 24 to adjust independently to minor changes in ground contour.

As discussed previously in relation to FIG. 5, FIG. 4 from another perspective illustrates how each gang of packer wheels 24 is rotationally mounted and connected by means of axle 56, which in turn is journalled for rotation within pairs of packer support legs 54, which are connected to the lateral packer pivot arm 50 in each case. The pair of pivot arms 50 are respectively connected to pivots 52 which in turn are connected to respectve packer swing arms 46 which pivot about pivots 47. The combination of pivots 52 and 47 enables the gangs of packers 24 to move not only upwardly or downwardly but also tilt from side to side. This combination enables the two gangs of packers 24 to accommodate virtually every type of ground contour.

Figure 6:
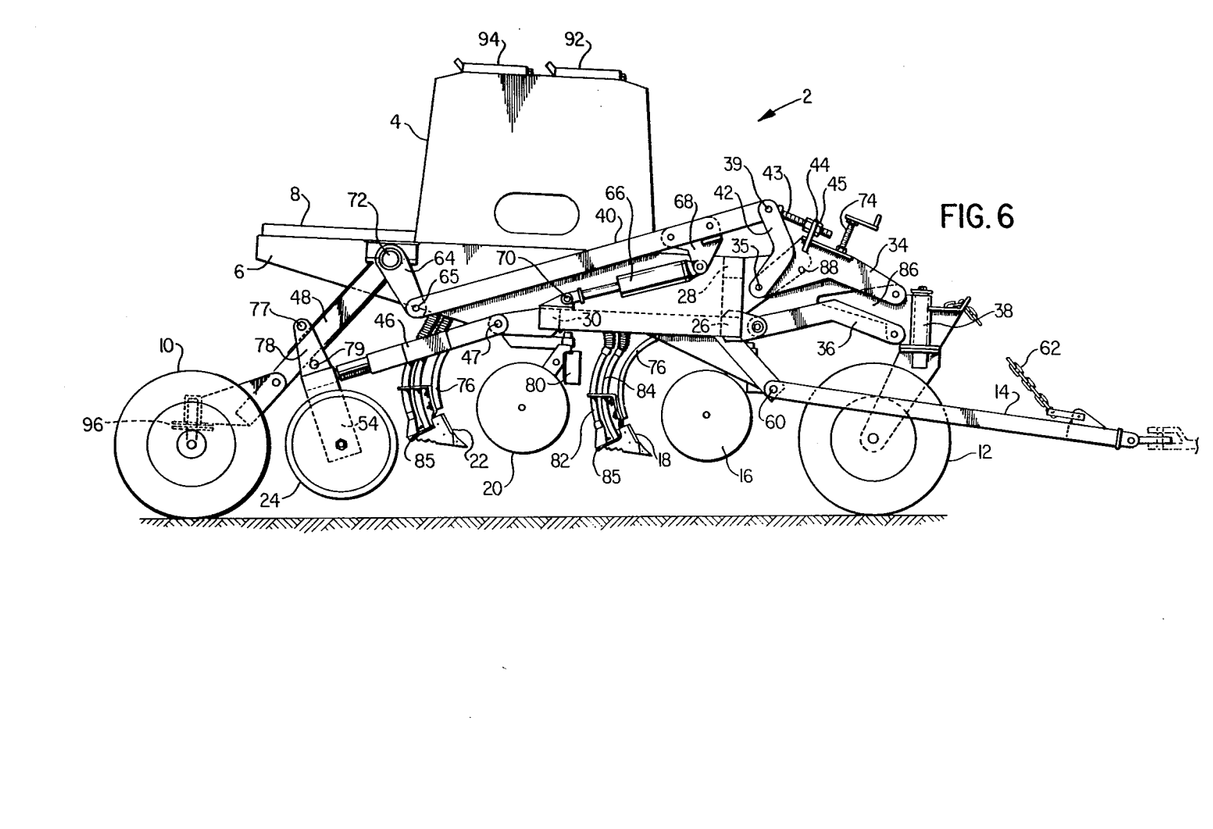
FIG. 6 illustrates a side elevation partially cut-away view of the zero-till drill with Coulter disks, seed drills and packer wheels raised above the ground.

FIG. 6 illustrates a side elevation partly cut away view of the zero-till drill 2, with the various connecting bars and tie bars that together cooperate to provide the zero-till drill 2 with its many advantages. FIG. 6 illustrates the zero-till drill 2 with the forward Coulter disks 16, forward seed and fertilizer drills 18, rear Coulter disks 20, rear seed and fertilizer drills 22, and packer wheels 24, in raised position, while the two transport wheels 10 ride on the ground. This is the orientation which is used when the zero-till drill 2 is being transported from location to location, or when the zero-till drill 2 completes a pass on the field which is being sown and fertilized.

A particular advantage of being able to raise the disks 16 and 20, drills 18 and 22, and packer wheels 24, off the soil at the end of each pass is that excessive soil packing does not take place as the drill 2 is brought around to commence the next pass on the field. In other words, with the construction illustrated, the disks 16 and 20, drills 18 and 22, and packer wheels 24, can be rapidly raised and lowered as required, thereby ensuring that they ride on the ground only when actual seeding and fertilization takes place along a pass on a field. While it is not shown in FIG. 6, the dispensers for the seed and the fertilizer are driven by an on-off system which is linked to and driven by wheel 130 as seen in FIG. 1. Wheel 130 is spring loaded to retain strong contact with the ground and is connected to the main frame 6 to disengage the drive system when the undercarriage of the drill 2 is raised. Consequently, seed and fertilizer are only dispensed while disks 16 and 20, drills 18 and 22 and packer wheels 24 are in contact with the ground. This conserves seed and fertilizer.

In FIG. 6, it can be seen that draw bar 14 can be raised or lowered about pivot point 60 and held in any desired position by draw bar elevation chain 62. As explained in part previously, the forward ends of upper parallel bar 34 and lower parallel yoke 36 pivotally connect with caster swivel 38. The parallel upper bar 34 and lower yoke 36 combination is an important feature of the zero-till drill 2 because the combination enables proper efficient operation of the caster wheels 12. For caster wheels 12 to swivel freely and properly to the left or right, it is important that the vertical rotational axis of caster swivel 38 remains substantially vertical. This is accomplished by the unique combination of parallel upper bar 34 and parallel lower yoke 36 which, even when moved, maintain swivel 38 in vertical or near vertical position.

Forward link bar 42 is pivotally connected at each end. The lower end is pivotally connected to upper parallel bar 34 at pivot 35 and to main frame 6 by means of raised stop 88. The upper end of forward link bar 42 is pivotally connected by pivot 39 to main tie bar 40, which extends longitudinally throughout most of the length of the main frame 6. The rear end of main tie bar 40 is pivotally connected to the lower end of rear link bar 64 at pivot 65. The upper end of rear link bar 64 in turn is pivotally connected to rocker shaft 72, which extends laterally across the width of the rear portion of main frame 6. The transport wheel swingarms 48 are also pivotally connected at the forward end to rocker shaft 72.

A forward cylinder mount 68 is connected to the main tie bar 40 about one-fourth of the distance from the front end of main tie bar 40. A hydraulic cylinder 66 is pivotally connected to forward cylinder mount 68 at its forward end, while at its rear end, it is connected to rear cylinder mount 70. Rear cylinder mount 70 is rigidly connected direcly to the main frame 6 at rear lower cross-bar 30.

Figure 7:
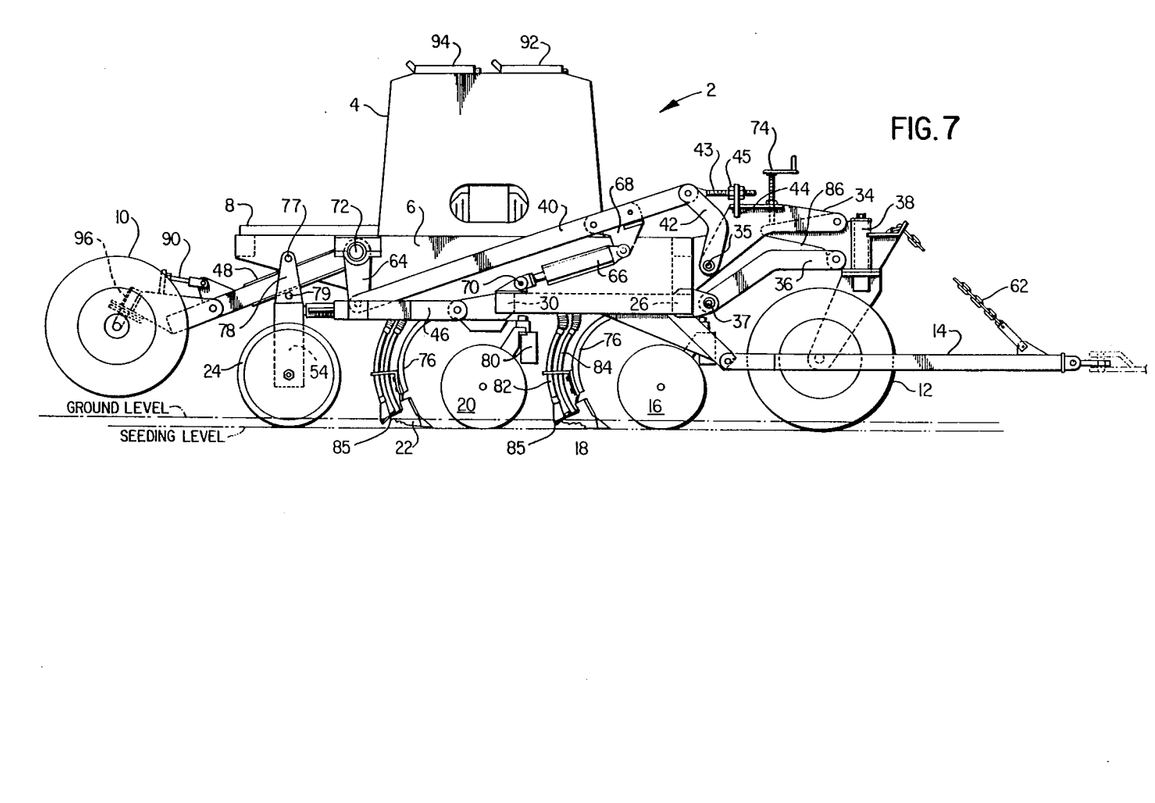
FIG. 7 illustrates a side elevation partially cut-away view of the zero-till drill with the Coulter disks, seed drills and packer wheels riding on the ground.

By means of the complex linkage engendered by lower parallel yoke 36, upper parallel bar 34, forward link bar 42, main tie bar 40, rear link bar 64, transport wheel swing arm 48, and packer swing arm 46, and the application of hydraulic pressure upon cylinder 66, to move it to an extended position, it is possible to raise the linkage combination so that the caster wheels 12 and the transport wheels 10 ride on the ground, while the disks 16 and 20, drills 18 and 22 and packer wheels 24 are raised off the ground (FIG. 6). Conversely, by returning cylinder 66 to its non-hydraulically extended position, (as seen in FIG. 7), the linkage assembly operates such that disks 16 and 20, drills 18 and 22 and packer wheels 24 ride on the ground, along with forward caster wheels 12. Meanwhile, in this latter position, rear transport wheels 10 are raised off the ground by means of transport wheel swing arms 48. In this orientation, the disks 16 and 20, drills 18 and 22, and packer wheels 24, are in a position for seeding and fertilizing as a pass is made across the field. It should be noted that in the lowered position (as seen in FIG. 7), the effective wheel base is the distance between the caster wheels 12 and the packer wheels 24. This is a shorter wheel base than would be the case if transport wheels 10 continued to ride on the ground. The shorter wheel base enables disks 16 and 20 and drills 18 and 22 to more closely follow the uneven contours of the ground and ensure consistent seeding depths.

The force which packer wheels 24 exert on the ground can be adjusted by means of mechanical packer pressure adjustment 44. Adjustment 44 is constructed of a bolt 43 and nut 45 combination which can be used to regulate the distance between upper parallel bar 34 and link bar 42. Adjusting this distance regulates the position of the packer wheel 24 by means of the interviewing main bar 40, rear link bar 64, swing arm 48 and swing arm lock 78. Thus, if the farmer notes that the packer wheels 24 are exerting either too little or too great a force on the ground, as the zero-till drill 2 is drawn along the pass, he can lengthen or shorten the distance between bar 34 and bar 42 by making an appropriate adjustment on mechanism 44 by turning the nuts 45 clockwise or counterclockwise as required.

The depth to which the overall linkage assembly can be lowered is determined by depth stop 86 which is rigidly connected to caster swivel 38. Conversely, the height to which the linkage assembly can be raised is determined by raise stop 88 (which is shown in greatest detail in FIG. 6). At the raised position, the bottom edge of adjustment 44 contacts the top edge of stop 88, thereby restricting further movement.

The zero-till drill 2 also has an important manual locking feature. Crank 74, including arm and handle, can be screwed upwardly or downwardly as required in order to not only regulate the point at which depth stop 86 is contacted but to lock the linkage assembly in a desired position such as for transport. The distance to which the disks 16 and 20, drills 18 and 22, and packer wheels 24 can be lowered, is regulated by crank 74 and its contact point with depth stop 86.

Another important feature of the zero-till drill 2, as seen in FIG. 6, is that when the transport wheels 10 are in a lowered position, the transport wheel swing arms 48 are firmly fixed between upper pin 77 and lower pin 79 of transport wheel swingarm lock 78. In other words, when the transport wheels 10 ride on the ground, the two swing arms 48 are moved respectively to a position which is snug between upper pin 77 and lower pin 79 of lock 78. This locking action of lock 78 in turn secures the packer swing arms 46 and packer wheels 24 into a raised position above the ground and prevents them from moving upwardly or downwardly. The combination of upper pin 77 and lower pin 79, together with swing arm 48, also contributes along with raise stop 88 in determining the maximum height to which the linkage structure of the zero-till drill 2 can be raised.

Alternatively, when the packer wheels 24 are in a lowered position and ride on the ground, and transport wheels 10 are in a raised position above the ground, as shown in FIG. 7, there is a certain amount of "play" between the transport wheel swing arms 48 and the upper pin 77 and lower pin 79 of transport wheel swing arm lock 78. In this position, and even though transport wheels 10 are secured in raised position by the linkage structure, the packer wheels 24 can move upwardly or downwardly in order to respond to variations in ground contour. Thus, the packer wheels 24 are not forced to dig into the ground or pack too lightly, which would be the case if there was no "play" between swing arm 48 and upper and lower pins 77 and 79.

FIGS. 6 and 7 also illustrate in detail the construction of the disks 16 and 20, and the drills 18 and 22. The forward disks 16 are connected to pivot about respective vertical axes at discrete locations along forward lower cross-bar 26 while the rear disks 20 are similarly pivotally connected to rear lower cross-bar 30. The pivotal connection in each case includes a Coulter disk spring chamber 80. These spring chambers 80 enable the vertical elevations of disks 16 and 20 to respond upwardly or downwardly to changes in ground contour. The springs inside the spring chambers 80 cause the disks 16 and 20 to exert a predetermined force upon the ground in order to ensure that the stubble and soil are cut to form grooves for the respective following drills 18 and 22.

Seed and fertilizer drills 18 and 22 are also respectively connected to the main frame 6 by means of spring steel shanks 76. These spring steel shanks 76 are formed of spring steel and enable the drills 18 and 22 respectively to move upwardly or downwardly in response to changes in ground elevation, or move laterally in order to avoid rocks or other hard objects which they might encounter. Seed and fertilizer drills 18 and 22 are constructed to have a nose made of a hardened metal which does not wear appreciably with use and can withstand impact with stones and the like. The seed and fertilizer drills 18 and 22 also have a separate fertilizer opening which is typically 1½ to 2½ inches lower than the seed opening. This ensures that the fertilizer is deposited in the soil approximately 1½ to 2½ inches below the seed. Thus, the germinated seed is encouraged to direct its roots downwardly towards the fertilizer, thereby ensuring a strong root system, and a healthy and productive crop. Seed and fertilizer for the forward drills 18 is supplied through flexible seed line 82, and flexible fertilizer line 84 which connect with the fertilizer and hoppers encased in hopper housing 4. A similar arrangement exists for rear drills 22.

To ensure that the seed does not fall directly upon the fertilizer which is deposited in the soil through the first lower opening of the drill 18 or 22, the seed first drops out of flexible seed line 82 through an opening in the drill 18 or 22 onto a tapered back plate which is attached to the rear portion of the drill 18 or 22. The back plate 85 tends to ride on the top of the soil as the drill 18 or 22 is moved through the soil and delays the seed dropping into the groove. Thus, when the fertilizer is dropped into the groove in the soil at a lower elevation than the seed, the soil has an opportunity to fall back into the groove above the fertilizer, and cover the fertilizer before the seed reaches the groove. Back plate 85 also has a downwardly curved construction and by riding over the groove before the seed is deposited, assists in moving soil into the groove above the fertilizer. The delaying action caused by having the seed first drop on the back plate 85, before falling onto soil which has been moved into place above the fertilizer by the action of back plate 85, is an important feature of this invention.

FIG. 7 also illustrates transport wheel adjustment 90. This adjustment 90 enables the farmer to adjust upwardly or downwardly the elevation of transport wheel 10 relative to transport wheel swingarm 48. This adjustment feature provides another important advantage of the zero-till drill 2 in that the elevation of the transport wheel 10 relative to the elevation of packer wheels 24 can be adjusted to meet the various field conditions which might be encountered by the zero-till drill 2.

Another important feature of the zero-till drill 2 is that transport wheels 10 can be rotated 90 degrees about a vertical axis created by transport wheel pivot 96 (which is visible in dotted lines behind transport wheel 10). The facility of being able to rotate transport wheels 10 through an arc of 90 degrees in combination with caster wheels 12, which can also be rotated to a right angle position, enables the entire zero-till drill 2 to be moved laterally. Intermediate positions of rotation of transport wheels 10 are also possible, which in combination with caster wheels 12 enable the drill 2 to be moved at angles between the longitudinal and lateral directions. This lateral movement capability is important in tight situations such as when two or more drills 2 are connected side by side and they must be towed from one end in order to pass through gates in fences or travel down a roadway. The lateral movement capability is also useful in assisting storage of the drill 2 in a barn or a garage, or the farmer wants to seed in fenced corners of a field.

A further important feature of the drill 2 is that when the disks 16 and 20, drills 18 and 22, and packer wheels 24, are raised off the ground, and the transport wheels 10 ride on the ground as illustrated in FIG. 6, the zero-till drill 2 rides entirely on smoothly rolling pneumatically inflated rubber tires (10 and 12). This feature enables the zero-till drill 2 to be pulled on highways, gravel roads and the like, at speeds double or triple the speeds which would be possible if the metal packer wheels 24 continued to ride on the ground. Faster towing speeds enable the zero-till drill 2 to be moved from location to location in less time, thereby maximizing the valuable time available for seeding and fertilizing during the spring.

FIGS. 6 and 7 also illustrate fertilizer door 92 and seed door 94, located at the top of fertilizer-seed hopper housing 4. While not shown in FIGS. 6 and 7, hopper housing 4 encases in large part a forward fertilizer hopper 106 and a rearward seed hopper 110, which will be discussed in detail below. Fertilizer door 92 and seed door 94 permit access to these respective hoppers. The forward fertilizer hopper 106 supplies fertilizer to the drill 18 through flexible line 84, while the rear seed hopper 110 supplies seed to the drill 18 through flexible seed line 82.

Figure 8:
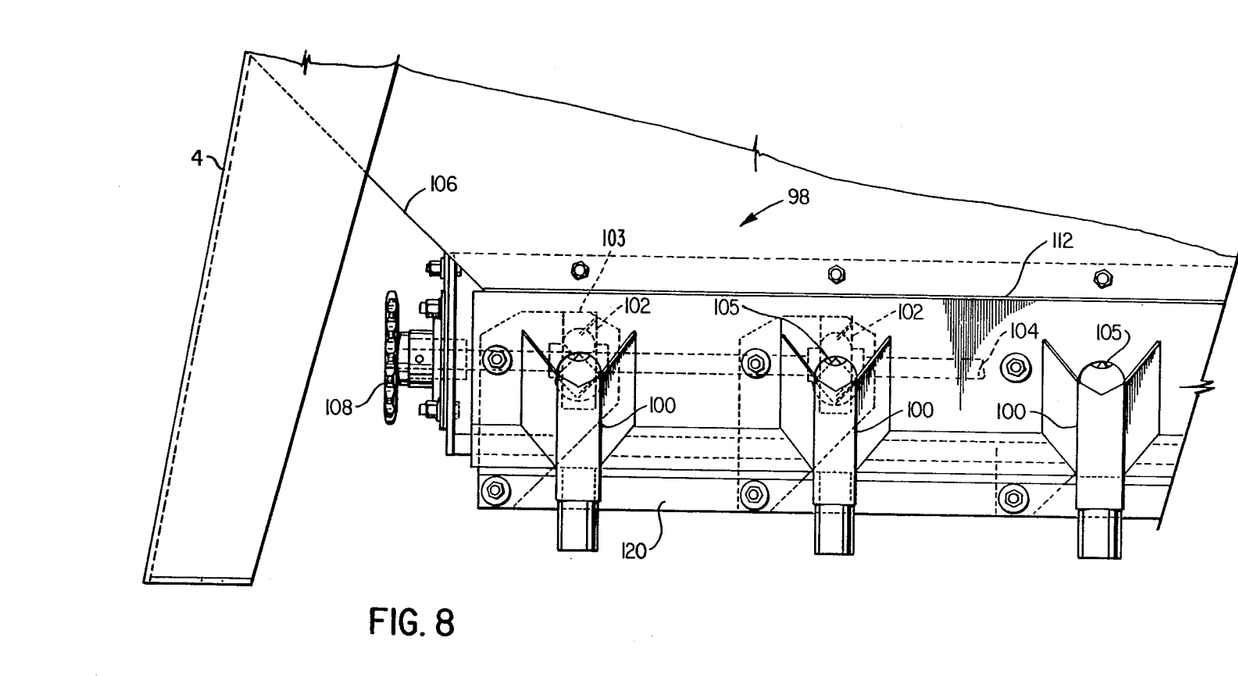
FIG. 8 illustrates a front elevation view of the seed and fertilizer metering and dispensing mechanism.

Referring to FIG. 8, which illustrates a detailed front elevation view of the seed and fertilizer dispensing and metering mechanism 98, hopper 106 is shown enclosed within hopper housing 4. A plurality of seed tubes are arranged laterally across the bottom of the hopper 106 in front of forward trough 112. Located behind each respective seed tube 100, is a corresponding seed feed wheel 102 (shown in dotted lines in FIG. 8). These seed feed wheels 102 are spatially mounted along seed feed wheel shaft 104 (also shown in dotted lines in FIG. 8) which rotates and thereby causes the respective seed feed wheels 102 to rotate. The seed feed wheels 102 are fitted with angled vanes 103 which convey and push the seed through the respective seed openings 105. The apertures of these openings 105 are adjustable, as will be explained below. In operation, the seed feed wheels 102, which rotate about wheel shaft 104, push seed and fertilizer from within the trough 112 through the openings 105 into the respective seed tubes 100. From there, the seed is conveyed through the seed tubes 100 into seed lines 82, which by gravity transport the seed to the forward drill 18. As mentioned previously, wheel shaft 104 is driven by a linkage which is connected to wheel 130. Thus, seed or fertilizer is only dispensed while the linkage with wheel 130 is engaged.

The aperture of the openings 105 can be adjusted to regulate seed and fertilizer dispensing rates. The mechanism for adjusting each opening 105 respectively is linked by means of connecting bar 120. A lever arm on the connecting bar 120 is hooked to the aperture opening plate and the degree of opening is shown by the position of the pointer on plate 122. The lever can be locked in desired position by means of a wing nut and bolt combination (not shown).

Figure 9:
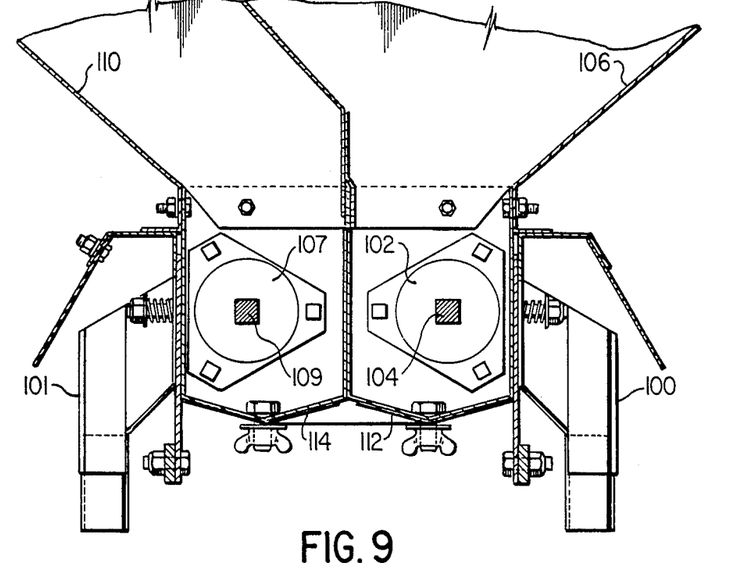
FIG. 9 illustrates a side elevation view of the metering and dispensing mechanism taken along section line A—A of FIG. 8.

FIG. 9 illustrates in side elevation view the construction of the forward seed hopper 110, forward seed trough 112, forward hopper 106, rear seed hopper 110, and rear fertilizer trough 114. Mounted within forward seed trough 112 are seed feed wheels 102, mounted on seed feed wheel shafts 104. The seed tubes 110 as connected to the face of forward seed trough 112 are also shown.

The rear seed trough 114 encloses a corresponding set of seed feed wheels 107 and shafts 109 which convey fertilizer pellets through tubes 101. The fertilizer tube 101 is shown connected to the rear face of rear trough 114. Tubes 101 connect with and convey the fertilizer to fertilizer lines 84.

Figure 10:
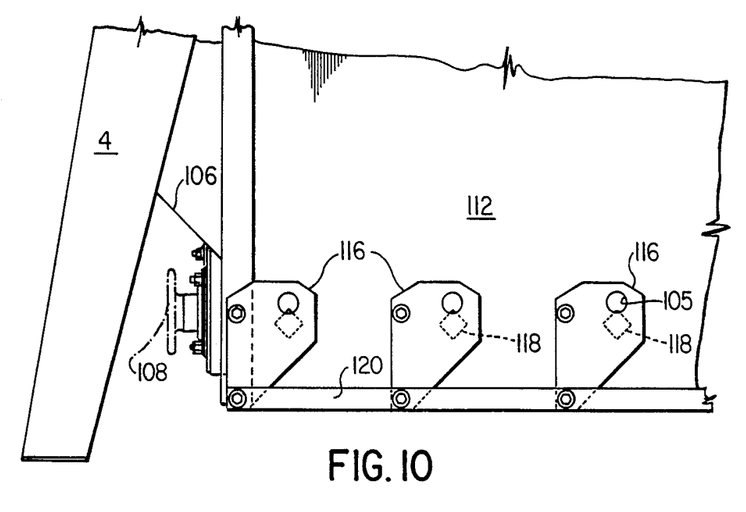
FIG. 10 illustrates a detailed frontal view of the adjustable seed metering mechanism.

FIG. 10 illustrates a detailed view of the adjustable spatially disposed opening plates 116 which by means of common connecting bar 120, are positioned in front of the respective openings 105 in the seed trough 112. The aperture of each opening 105 is controlled by moving the respective adjustable opening plate 116, which has a circular opening therein, relative upwardly or downwardly to diamond-shaped trough opening 118, which is cut in the wall of the forward trough 112. The combination of a circular opening and a diamond-shaped opening is an important feature of the invention. The aperture of openings in feed mechanisms of hoppers used in the prior art are usually controlled by means of one circular opening moving relative to another circular opening. This tends to provide an uneven rate of aperture opening because the degree of overlap (the effective opening) between the respective areas of the openings as they are moved relative to one another does not increase in a linear fashion. Likewise, two triangular openings or two diamond-shaped openings, when moved relative to one another, do not provide an aperture which opens and closes at a generally linear rate. In this invention, the combination of a diamond-shaped opening and a circular-shaped opening has been discovered to provide an aperture (determined by the overlap) which increases or decreases in approximately a linear fashion as the diamond and circle are moved relative to one another.

Figure 11:
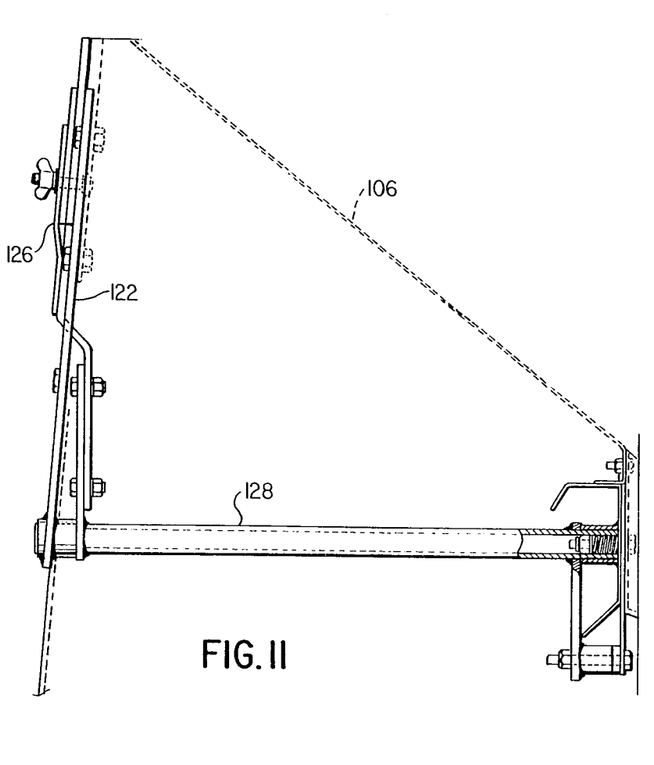
FIG. 11 illustrates a side view of the seed opening gauge.
Figure 12:
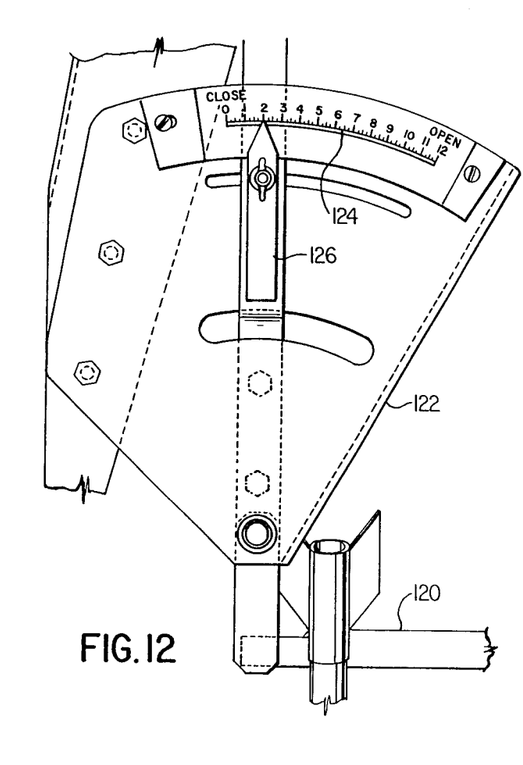
FIG. 12 illustrates a front view of the seed opening gauge.

FIG. 11 illustrates a side view of an opening gauge 122, a pair of which are positioned on the front and rear faces of hopper housing 4 (see FIGS. 1 and 2). FIG. 12 illustrates a detailed frontal view of the opening gauge 122. The purpose of each opening gauge 122 is to enable the operator of the zero-till drill 2 to determine accurately the aperture of the respective opening 105 which is present in the respective troughs 112 and 114. The aperture of each opening 105 is displayed by means of a scale 124, and a pointer 126. Pointer 126 is connected by means of gauge connecting rod 128 to a linkage which in turn is connected to connecting bar 120. As the aperture of opening 105 is opened or closed, connecting bar 120 is moved accordingly, and this in turn, by means of the connecting rod 128, moves pointer 126 proportionally along scale 124. Since the opening for the rear and foward hoppers 106 and 110 may not necessarily be the same, a separate opening gauge 122 is provided for each hopper.

Finally, wheel 130, as shown in FIG. 1 can function as an area tally which is an optional feature of the zero-till drill 2. Wheel 130 consists of a pneumatically inflated rubber tire. The principal function of wheel 130 is to drive the seed and fertilizer dispensing system. However, the wheel 130 can, in addition, as an optional feature, serve as a distance tally as it rolls along the ground as the zero-till drill 2 is drawn by a suitable vehicle such as a tractor. The purpose of the acre tally wheel 130 is to account for the distance that the zero-till drill 2 is drawn and from this a calculation as to acreage. and seed and fertilizer consumed per acreage can be made.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A zero-till drill comprising:
   (a) a frame:
   (b) at least one disk and at least one seed drill mounted on said frame;
   (c) first transport wheels which are rotatably attached to said frame at one end thereof;
   (d) second transport wheels which are rotatably attached to said frame at the end thereof which is opposite the end to which said first transport wheels are attached;
   (e) a swing arm interposed between said frame and said second transport wheels, said wing arm being pivotally attached to said frame;
   (f) at least one packer wheel mounted on said swing arm;
   (g) linkage means for moving said swing arm to a lowered position where said second transport wheels cooperate with said first transport wheels to support the zero-till drill on the ground with said disk, seed drill and packer wheel being suspended above the ground, and a raised position where said disk, seed drill and packer wheel are in operative contact with the ground and said second transport wheel is suspended above the ground; and
   (h) coupling means for mounting said packer wheel to said swing arm and for permitting said packer wheel to move a limited distance vertically relative to said frame when said linkage means is in its raised position and for preventing movement of said packer wheel relative to said frame when said linkage means is in its lowered position.

2. The zero-till drill of claim 1 wherein said coupling means comprises:
   (a) a support leg which rotatably carries said packer wheel;
   (b) an arm having a first end which is attached rotatably to said frame and a second end which is attached to said support leg intermediate its ends;
   (c) an arm lock which is joined to said support leg and has a pair of pins which straddle said swing arm with one of said pins being disposed on opposed sides thereof.

3. The zero-till drill of claim 1 including a parallelogram linkage which is interposed between said frame and said first transport wheels wherein said linkage means includes means for moving said first transport wheels away from said frame as said swing arm is moved to its lowered position and moving said first transport wheel towards said frame as said swing arm is moved toward its raised position.

* * * * *